United States Patent
Yeh et al.

(10) Patent No.: US 8,942,099 B2
(45) Date of Patent: Jan. 27, 2015

(54) METHOD AND APPARATUS OF IP FLOW MOBILITY IN 4G WIRELESS COMMUNICATION NETWORKS

(71) Applicants: Mediatek, Inc., Hsin-Chu (TW); National Taiwan University, Taipei (TW)

(72) Inventors: Shu-Hao Yeh, New Taipei (TW); Kuo-Wei Lin, Taoyuan County (TW); Po-Han Chiang, New Taipei (TW); Wan-Jiun Liao, Taipei (TW); Chao-Chin Chou, Taipei (TW)

(73) Assignee: Mediatek Inc. (TW)

( * ) Notice: Subject to any disclaimer, the term of this patent is extended or adjusted under 35 U.S.C. 154(b) by 235 days.

(21) Appl. No.: 13/622,559

(22) Filed: Sep. 19, 2012

(65) Prior Publication Data
US 2013/0070596 A1    Mar. 21, 2013

Related U.S. Application Data

(60) Provisional application No. 61/537,222, filed on Sep. 21, 2011.

(51) Int. Cl.
| | |
|---|---|
| H04L 12/26 | (2006.01) |
| H04W 36/00 | (2009.01) |
| H04W 76/04 | (2009.01) |
| H04W 28/02 | (2009.01) |
| H04W 88/16 | (2009.01) |

(52) U.S. Cl.
CPC ........ *H04W 36/0038* (2013.01); *H04W 76/041* (2013.01); *H04W 28/0263* (2013.01); *H04W 88/16* (2013.01)
USPC ........................................ 370/235

(58) Field of Classification Search
USPC ........................................ 370/235
See application file for complete search history.

(56) References Cited

U.S. PATENT DOCUMENTS

| | | | |
|---|---|---|---|
| 8,515,465 B2 * | 8/2013 | Olsson et al. | 455/458 |
| 2009/0303932 A1 | 12/2009 | Tsirtsis et al. | 370/328 |
| 2010/0080172 A1 | 4/2010 | Jin et al. | 370/328 |

(Continued)

FOREIGN PATENT DOCUMENTS

| | | |
|---|---|---|
| WO | WO2010088967 A1 | 8/2010 |
| WO | WO2011104149 | 9/2011 |

OTHER PUBLICATIONS

3GPP TR 23.861.*

(Continued)

*Primary Examiner* — Brian D Nguyen
*Assistant Examiner* — Abdullahi Ahmed
(74) *Attorney, Agent, or Firm* — Zheng Jin

(57) ABSTRACT

A method to realize IP flow mobility (IFOM) between 3GPP access and non-3GPP access over GTP based interfaces is proposed. A user equipment is connected to a PDN-GW via a 3GPP access network and a non-3GPP access network. The UE transmits an IFOM triggering message to the PDN-GW, which selects IP flows to be moved based on EPS bearer ID and IP flow description. The PDN-GW sends an Update Bearer Request to a WAG or ePDG, and updates its mapping table if the Update Bearer Request is successful. The UE also updates its mapping table upon receiving an IFOM acknowledgement from the WAG or ePDG. The PDN-GW initiates a 3GPP bearer modification procedure to move the selected IP flows.

20 Claims, 12 Drawing Sheets

(56) References Cited

U.S. PATENT DOCUMENTS

| | | | | |
|---|---|---|---|---|
| 2010/0329243 | A1* | 12/2010 | Buckley et al. | 370/352 |
| 2011/0090794 | A1 | 4/2011 | Cherian et al. | 370/235 |
| 2011/0310906 | A1 | 12/2011 | Stenfelt et al. | 370/401 |
| 2012/0092994 | A1* | 4/2012 | Wang et al. | 370/235 |
| 2013/0028087 | A1* | 1/2013 | Xiong et al. | 370/235 |
| 2014/0219248 | A1* | 8/2014 | Reddiboyana et al. | 370/331 |

OTHER PUBLICATIONS

International Search Report and Written Opinion of International Search Authority for PCT/CN2012/081750 dated Dec. 27, 2012 (10 pages).

3GPP TR 23.861 v1.3.0. Multi Access PDN Connectivity and IP Flow Mobility (release 9), Sep. 2009 the whole document.

3GPP TS 23.261 v10.1.0. IP Flow Mobility and Seamless Wireless Local Area Network (WLAN) Offload, Sep. 2010 the whole document.

3GPP TR 23.861 v1.3.0, 3rd Generation Partnership Project, Technical Specification Group Services and System Aspects, Multi access PDN connectivity and IP flow mobility (Release 9), Sep. 2009.

JPO Office Action for the JP patent application 2014-525302 dated Nov. 18, 2014 (4 pages).

Tansir Ahmed et al., Multi-Access Data Network Connectivity and IP Flow Mobility in Evolved Packet system (EPS), Proc.of 2010 Wireless Communications and Networking Conf., Apr. 18, 2010 (6 pages).

* cited by examiner

| IMSI | RAT TYPE | TEID | EPS BEARER ID | ROUTING FILTER |
|---|---|---|---|---|
| UE1 | 3GPP | TUNNEL 1 | EPS ID 1 | DESCRIPTION OF IP FLOWS 1-1 |
| | | | EPS ID 2 | DESCRIPTION OF IP FLOWS 2-2 |
| | NON-3GPP | TUNNEL 2 | EPS ID 2 | DESCRIPTION OF IP FLOWS 2-1 |
| | | | EPS ID 3 | DESCRIPTION OF IP FLOWS 3-1 |
| | | | EPS ID 4 | DESCRIPTION OF IP FLOWS 4-1 |
| | | | | DESCRIPTION OF IP FLOWS 4-2 |
| UE 2 | 3GPP | TUNNEL 3 | EPS ID 5 | DESCRIPTION OF IP FLOWS 5-1 |
| | | | EPS ID 6 | DESCRIPTION OF IP FLOWS 6-1 |
| --- | --- | --- | --- | --- |

| RAT TYPE | EPS BEARER ID | ROUTING FILTER |
|---|---|---|
| 3GPP | EPS ID 1 | DESCRIPTION OF IP FLOWS 1-1 |
| | EPS ID 2 | DESCRIPTION OF IP FLOWS 2-2 |
| NON-3GPP | EPS ID 2 | DESCRIPTION OF IP FLOWS 2-1 |
| | EPS ID 3 | DESCRIPTION OF IP FLOWS 3-1 |
| | EPS ID 4 | DESCRIPTION OF IP FLOWS 4-1 |
| | | DESCRIPTION OF IP FLOWS 4-2 |

FIG. 7

| IMSI | RAT TYPE | TEID | EPS BEARER ID | ROUTING FILTER |
|---|---|---|---|---|
| UE1 | 3GPP | TUNNEL 1 | EPS ID 1 | DESCRIPTION OF IP FLOWS 1-1 |
| | NON-3GPP | TUNNEL 2 | EPS ID 2 | DESCRIPTION OF IP FLOWS 2-1 |
| | | | EPS ID 2 | DESCRIPTION OF IP FLOWS 2-2 |
| | | | EPS ID 3 | DESCRIPTION OF IP FLOWS 3-1 |
| | | | EPS ID 4 | DESCRIPTION OF IP FLOWS 4-1 |
| | | | | DESCRIPTION OF IP FLOWS 4-2 |
| UE 2 | 3GPP | TUNNEL 3 | EPS ID 5 | DESCRIPTION OF IP FLOWS 5-1 |
| | | | EPS ID 6 | DESCRIPTION OF IP FLOWS 6-1 |
| --- | --- | --- | --- | --- |

| RAT TYPE | EPS BEARER ID | ROUTING FILTER |
|---|---|---|
| 3GPP | EPS ID 1 | DESCRIPTION OF IP FLOWS 1-1 |
| NON-3GPP | EPS ID 2 | DESCRIPTION OF IP FLOWS 2-1 |
| | EPS ID 2 | DESCRIPTION OF IP FLOWS 2-2 |
| | EPS ID 3 | DESCRIPTION OF IP FLOWS 3-1 |
| | EPS ID 4 | DESCRIPTION OF IP FLOWS 4-1 |
| | | DESCRIPTION OF IP FLOWS 4-2 |

FIG. 8

METHOD AND APPARATUS OF IP FLOW MOBILITY IN 4G WIRELESS COMMUNICATION NETWORKS

CROSS REFERENCE TO RELATED APPLICATIONS

This application claims priority under 35 U.S.C. §119 from U.S. Provisional Application No. 61/537,222, entitled "Method and Apparatus of IP Flow Mobility in 4G Wireless Communication Networks," filed on Sep. 21, 2011, the subject matter of which is incorporated herein by reference.

TECHNICAL FIELD

The present invention relates generally to mobile communication and, more particularly, to providing IP flow mobility in 4G wireless communication networks.

BACKGROUND

With the popularity of smart phones and high requirement of transmission rate, capacity exhaustion will be the most severe problem for mobile networks in the 4G and Beyond 4G (B4G) era. With the advent of mobile devices supporting multiple interfaces (e.g., 3GPP, WiFi, WiMAX, etc.), traffic offload from 3GPP to non-3GPP could relieve the capacity exhaustion problem. One way to realize traffic offload is via IP flow mobility (IFOM). IFOM allows selective movement of IP data flows between different access networks supporting different access technologies. IFOM solutions can be based on three different protocols: Dual-Stack Mobile IPv6 (DSMIPv6) protocol, Proxy Mobile IPv6 (PMIPv6) protocol, and GPRS Tunneling Protocol (GTP).

In 3GPP TR 23.861, multi-access packet data network (PDN) and IP flow mobility (IFOM) have been discussed. Various solutions for multi access PDN connectivity and IP flow mobility including IP flow mobility solutions for S2c (DSMIPv6) and IP flow mobility solutions for S2a (PMIPv6) are studied. The solutions include IP flow mobility based on routing filters UE provides to PDN-GW and IP flow mobility based on PCC (policy control and charging rules) for network-based mobility management procedures. However, IP flow mobility solutions for GTP have not been fully investigated.

US2009/0303932 A1 patent publication discloses a method and apparatus for facilitating network-based control of a forwarding policy used by a mobile node. The mobile node receives access network-specific signaling that is related to an IP flow. The mobile node then selects from multiple access networks to send the IP flow based on the signaling. The mobile node may also update a forwarding policy to indicate that the IP flow should be sent over the access network.

US2010/0080172 A1 patent publication discloses a proxy mobile internet protocol (PMIP) in a multi-interface communication environment. A communication entity (e.g., UE, AGW, PDN GW, etc.) notifies another communication entity to use a single IP address for connections to multiple AGWs. The communication entity also sends information that is related to at least one of the UE's IP flows to another communication entity.

US2011/0090794 A1 patent publication discloses techniques for wireless data communications employing IP flow mobility. Techniques for IP flow mobility are based on mobile IP protocols, such as PMIP and CMIP. The technique allows an access terminal (AT) moves at least one IP data flow, which is established between the AT and a first access network using a first technology type, to a second access network using a second technology type, while maintaining other data flows to the first access network. AT uses the same IP address to transmit or receive data flows through both of the access networks by maintaining a flow map in both mobility anchor and AT to identify the access gateway and thus the technology type each flow should be directed.

Many existing core network infrastructures, however, do not fully support mobile IP protocol. For example, the general packet radio service (GPRS) is a packet data mobile data service that supports mobile IP via GPRS tunneling protocol (GTP). It is thus desirable that IP flow mobility can also be supported based on GTP.

SUMMARY

A method to realize IP flow mobility (IFOM) between 3GPP access and non-3GPP access over GTP based interfaces is proposed. A user equipment (UE) is connected to a PDN-GW via a 3GPP access network and a non-3GPP access network. The UE transmits an IFOM triggering message to the PDN-GW, which selects IP flows to be moved based on EPS bearer ID and IP flow description. The PDN-GW sends an Update Bearer Request to a WAG or ePDG, and updates its mapping table if the Update Bearer Request is successful. The UE also updates its mapping table upon receiving an IFOM acknowledgement from the WAG or ePDG. The PDN-GW initiates a 3GPP bearer modification procedure to move the selected IP flows.

In certain embodiments, the IFOM solution is applied to move IP flows between 3GPP access and trusted non-3GPP access with GTP-based S2a interface. The UE is connected to the PDN-GW through a wireless access gateway via GTP tunneling. In certain other embodiments, the IFOM solution is applied to move IP flows between 3GPP access and non-trusted non-3GPP access with GTP-based S2b interface. The UE is connected to an evolved packet data gateway (ePDG) via IPSec tunneling and then to the PDN-GW through the ePDG via GTP tunneling.

In some embodiments, IFOM is triggered from the 3GPP access network. The IFOM triggering message may be broadly interpreted as a request bearer resource modification message, a bearer resource command, or an IP-CAN session signaling message. In some other embodiments, IFOM is triggered from the non-3GPP access network. The IFOM triggering message and the IFOM acknowledgement may be interpreted as an IFOM-enhanced IKEv2 message or an access network specific message. The IFOM triggering message comprises an IFOM flag, a target radio access technology (RAT) type, an EPS bearer ID, a Quality of Service (QoS) policy, and a traffic aggregation description (TAD). In one example, the IP flows to be moved are selected based on the TAD (e.g., IP flow-based IFOM). In another example, the IP flows to be moved are selected based on the EPS bearer ID associated with a specific QoS class (e.g., QoS-based IFOM).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 are updated IFOM mapping tables after IP flow-specific IFOM solution.

FIG. 8 are updated IFOM mapping tables after QoS-specific IFOM solution.

DETAILED DESCRIPTION

Reference will now be made in detail to some embodiments of the invention, examples of which are illustrated in the accompanying drawings.

Figure 1:
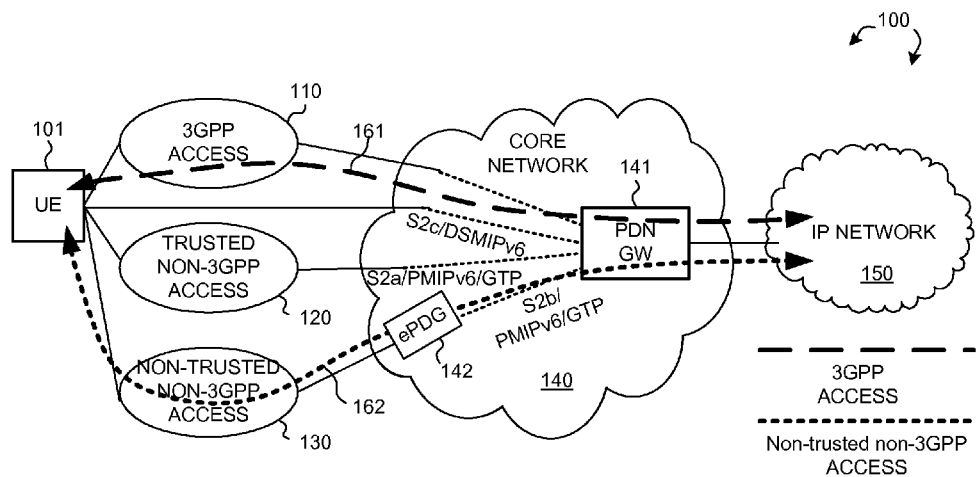
FIG. 1 illustrates a mobile communication network that supports access through 3GPP access and/or non-3GPP access in accordance with one novel aspect.

FIG. 1 illustrates a mobile communication network 100 that supports access through 3GPP and/or non-3GPP in accordance with one novel aspect. Mobile communication network 100 comprises a user equipment UE 101, a 3GPP access network 110 (e.g., LTE/E-UTRAN), a trusted non-3GPP access network 120 (e.g., CDMA 2000, WiMAX, WiFi), a non-trusted non-3GPP access network 130 (e.g., WiFi/WLAN), a 3GPP evolved packet core (EPC) network 140, and an external IP network 150. UE 101 may gain access to external IP network 150 via different radio access technologies (RAT) provided by different types of radio access networks. The EPC network 140 provides various EPC interfaces to support non-3GPP access networks. For example, UE 101 may connect to Packet Data Network Gateway (PDN-GW) 141 directly via S2c/DSMIPv6 interface, UE 101 may connect to PDN-GW 141 through trusted non-3GPP access network 120 via S2a/PMPIv6/GTP interface, and UE 101 may connect to PDN-GW 141 through non-trusted non-3GPP access network 130 via S2b/PMIPv6/GTP interface (e.g., through an evolved packet data gateway ePDG 142).

In the example of FIG. 1, UE 101 is simultaneously connected to PDN-GW 141 via both 3GPP access network 110 (e.g., long-dashed line 161) and non-trusted non-3GPP access network 130 (e.g., short-dashed line 162). When UE 101 is running various applications, multiple IP flows are routed through different accesses. Based on network operator's policies, the user's preferences and the characteristics of the applications and the accesses, the multiple IP flows are routed differently. When network condition changes (e.g., a network congestion happens), IFOM (IP Flow Mobility) allows selective movement of IP data flows between different access networks supporting different access technologies. IFOM solutions can be based on three different protocols: Dual-Stack Mobile IPv6 (DSMIPv6) protocol, Proxy Mobile IPv6 (PMIPv6) protocol, and GPRS Tunneling Protocol (GTP). The present application is mostly concerned with IFOM solutions based on GTP, which is widely adopted by operators and applied in legacy GPRS packet core. More specifically, how IP flows can be moved between 3GPP access network and non-3GPP access network over GTP-based interface.

Figure 2:
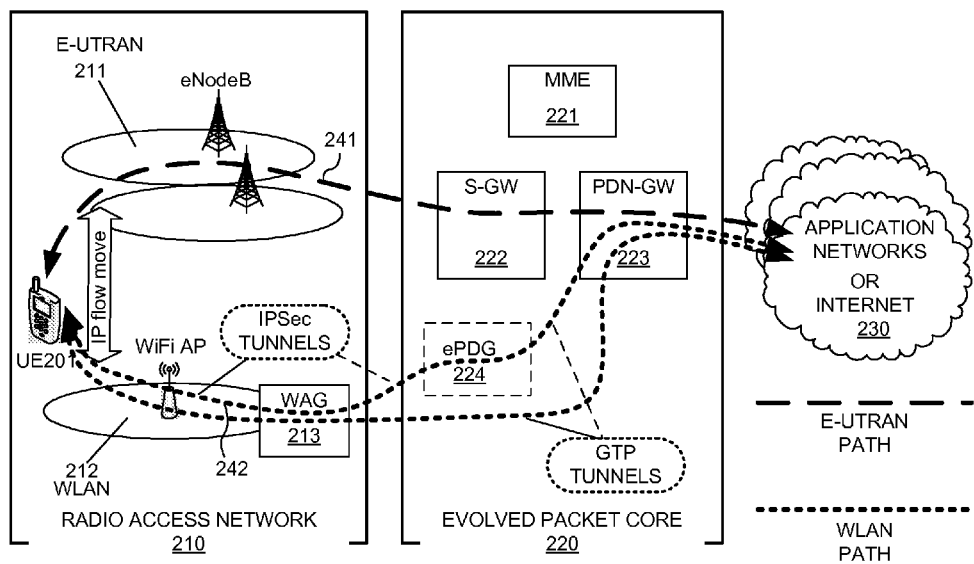
FIG. 2 illustrates an overview of network architecture for IP flow mobility in a mobile communication network in accordance with one novel aspect.

FIG. 2 illustrates an overview of network architecture for IP flow mobility in a mobile communication network 200. Mobile communication network 200 comprises a radio access network RAN 210 and a 3GPP EPC network 220. RAN 210 comprises an E-UTRAN 211 including a plurality of eNBs and a WLAN 212 including a WiFi AP and a wireless access gateway (WAG) 213. Each RAN provides radio access for user equipment UE 201 via different radio access technologies. EPC network 220 comprises a mobility management entity (MME) 221, a serving gateway (S-GW) 222, a packet data network gateway (PDN-GW) 223, and an optional evolved packet data gateway (ePDG) 224 if RAN 210 is deemed non-trusted by the operator of EPC 220. From UE 201 perspective, it is equipped with both a cellular transceiver and a WiFi transceiver, and is able to access application networks or the Internet 230 via cellular access (e.g., the E-UTRAN path denoted by long-dashed line 241) and/or WiFi access (e.g., the WLAN path denoted by short-dashed line 242). Multiple IP flows are routed through the 3GPP E-UTRAN path or the non-3GPP WLAN path. For example, UE 201 exchanges some IP flows through E-UTRAN 211, and some other IP flows through WLAN 212.

For non-3GPP WLAN access, IP connectivity from UE 201 to PDN-GW 223 is setup over GTP tunnels and optionally IPSec tunnels in case RAN 210 is deemed un-trusted by the operator of EPC 220. In the uplink direction, any packet is sent by UE 201 to WAG 213 or tunneled by UE 201 using IPSec tunnels to ePDG 224 in case RAN 210 is deemed un-trusted by the operator of EPC 220. The WAG or ePDG then tunnels the packet to the PDN-GW via proper GTP tunnel. From PDN-GW 223, normal IP-based routing takes place. In the downlink direction, any packet for UE 201 first arrives at PDN-GW 223. The PDN-GW tunnels the packet based on the mapping cache entry to WAG 213 or ePDG 224 via GTP tunnels. The WAG or ePDG then tunnels the packet to UE 201 using access network specific message (e.g., by WAG 213) or proper IPSec tunnel (e.g., by ePDG 224). When network condition changes, UE 201 determines to redistribute the IP flows between the 3GPP access and the non-3GPP access. In one novel aspect, a method to realize IP flow mobility between 3GPP access and non-3GPP access over GTP based interface is proposed.

Figure 3:
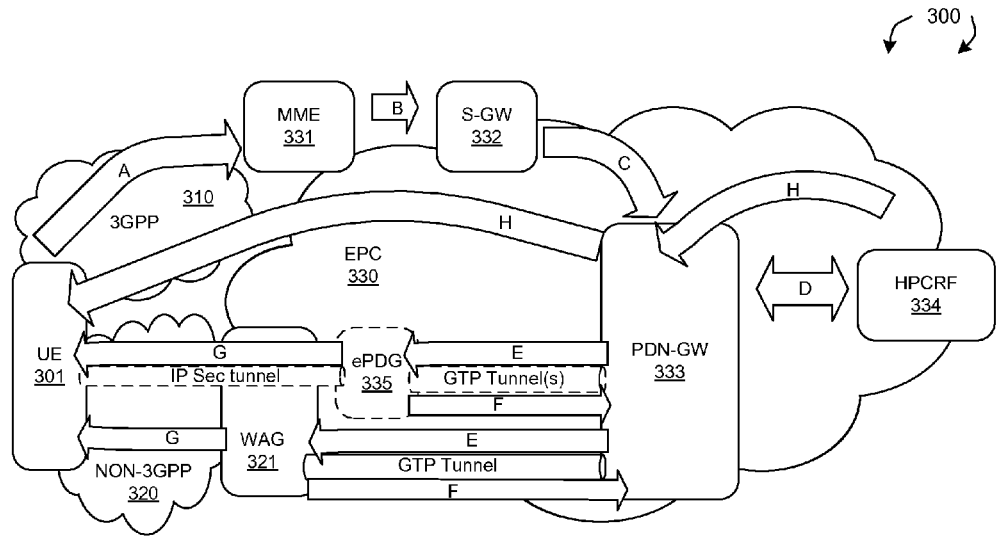
FIG. 3 illustrates an IP flow mobility solution that is triggered from 3GPP access network.

FIG. 3 illustrates an IP flow mobility solution that is triggered from 3GPP access network in a mobile communication network 300. Mobile communication network 300 comprises a UE 301, a 3GPP access network 310, a non-3GPP access network 320 comprising WAG 321, an EPC 330 comprising MME 331, S-GW 332, PDN-GW 333, hPCRF (home policy and charging rule function) 334, and optionally an ePDG 335 in case the non-3GPP access network 320 is deemed non-trusted by the operator of EPC 330. UE 301 is simultaneously connected the PDN-GW 333 via both 3GPP access network 310 and non-3GPP access network 320. When UE 301 decides to move certain IP flow(s) from 3GPP access network 310 to non-trusted non-3GPP access network 320 (e.g., when 3GPP access network 310 is congested), IFOM solution is triggered from 3GPP access network 310. First, UE 301 sends a signaling message to PDN-GW 333 through 3GPP access network 310 to trigger IFOM (step A, B, and C). PDN-GW 333 sends a signaling message to update hPCRF 334 based on the signaling it received (step D). The PDN-GW then sends a request to WAG 321 (or ePDG 335 in non-trusted case) to create/update a bearer to carry the IP flows to be moved from 3GPP access network 310 to non-3GPP access network 320 (step E). In response to the request, WAG 321 (or ePDG 335 in non-trusted case) sends a response back to PDN-GW 333 (step F). WAG 321 (or ePDG 335 in non-trusted case) also notifies UE 301 the success of IFOM signaling message (step G). Finally, hPCRF 334 triggers 3GPP Dedicated Bearer Deactivation and or Modification procedure for IP flows moved from 3GPP access to non-3GPP access (step H). The entire IP flow mobility procedure is then completed.

Figure 4:
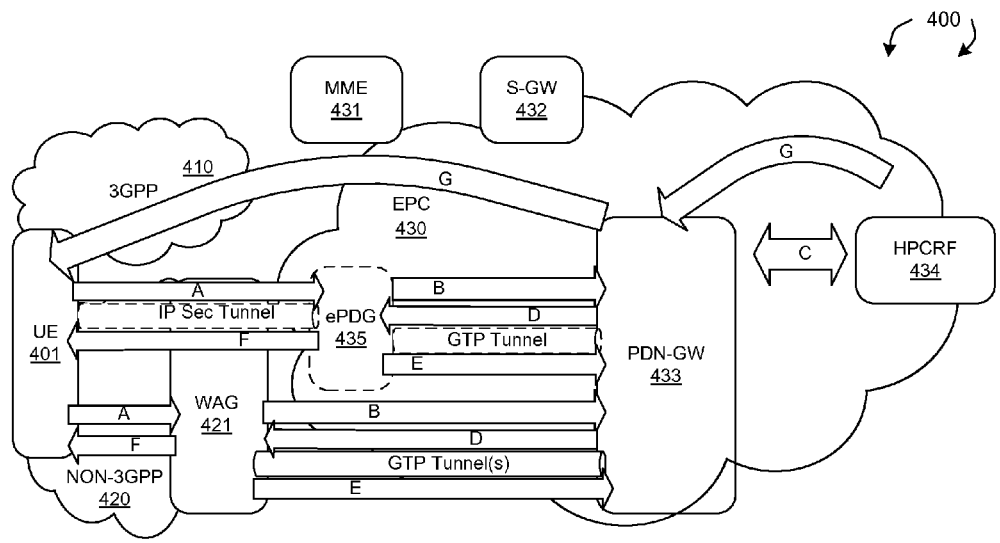
FIG. 4 illustrates an IP flow mobility solution that is triggered from non-3GPP access network.

FIG. 4 illustrates an IP flow mobility solution that is triggered from non-3GPP access network in a mobile communication network 400. Mobile communication network 400 comprises a UE 401, a 3GPP access network 410, a non-3GPP access network 420 comprising WAG 421, an EPC 430 comprising MME 431, S-GW 432, PDN-GW 433, hPCRF 434, and optionally an ePDG 435 in case the non-3GPP access network 420 is deemed non-trusted by the operator of EPC 430. UE 401 is simultaneously connected the PDN-GW 433 via both 3GPP access network 410 and non-3GPP access network 420. When UE 401 decides to move certain IP flow(s) from 3GPP access network 410 to non-trusted non-3GPP access network 420 (e.g., when 3GPP access network 410 is congested), IFOM solution is triggered from non-3GPP access network 420. First, UE 401 sends a signaling message to PDN-GW 433 through non-3GPP access network 420 to trigger IFOM (steps A and B). PDN-GW 433 sends a signaling message to update hPCRF 434 based on the signaling it received (step C). The PDN-GW then sends a request to WAG 421 or ePDG 435 to create/update a bearer to carry the IP flows to be moved from 3GPP access network 410 to non-3GPP access network 420 (step D). In response to the request, WAG 421 or ePDG 435 sends a response back to PDN-GW 433 (step E). WAG 421 or ePDG 435 also notifies UE 401 the success of IFOM signaling message (step F). Finally, hPCRF 434 triggers 3GPP Dedicated Bearer Deactivation and/or Modification procedure for IP flows moved from 3GPP access to non-3GPP access (step G). The entire IP flow mobility procedure is then completed.

Figures 5, 6:
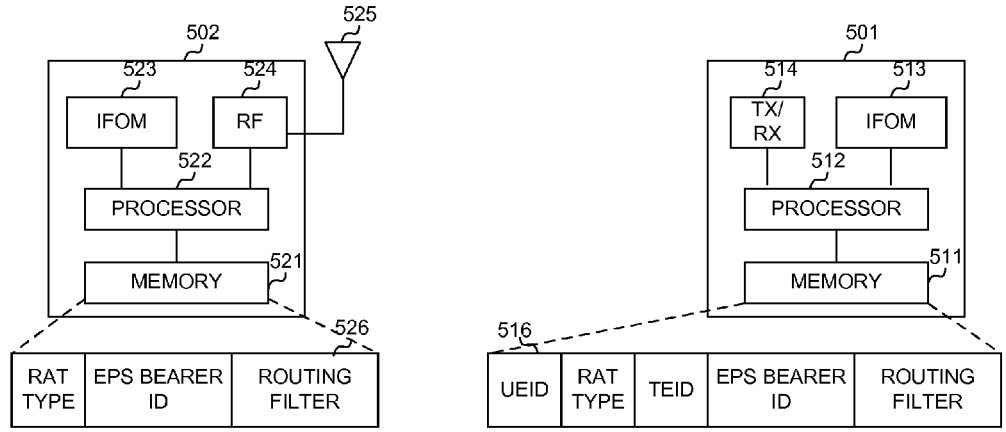
FIG. 5 illustrates IFOM mapping tables maintained in packet data network gateway and user equipment.
FIG. 6 is one example of a mapping table stored at PDN-GW side and a mapping table stored at UE side.

FIG. 5 illustrates simplified block diagrams of a PDN-GW 501 and a UE 502 and IFOM mapping tables maintained in the PDN-GW and the UE. PDN-GW 501 comprises memory 511, a processor 512, an IFOM module 513, and a network interface module 514 for transmitting and receiving data packets. Similarly, UE 502 comprises memory 521, a processor 522, an IFM module 523, and an RF module 524 coupled to an antenna 525 for transmitting and receiving data signals over the air interface. RF module 524 in turn comprises multiple transceivers for supporting both 3GPP and non-3GPP radio access technologies. The various modules are function modules and may be implemented by software, firmware, hardware, or any combination thereof. The function modules, when executed by processors 512 and 522 (e.g., via program instructions contained in memory 511 and 521), interwork with each other for UE 502 to trigger IFOM solution and for PDN-GW 501 to route IP flows through different access networks.

In order to indicate which access network each IP flow should be directed to, a mapping table needs to be maintained at both PDN-GW side and UE side. As illustrated in FIG. 5, mapping table 516 is maintained at the PDN-GW side, while mapping table 526 is maintained at the UE side. Mapping table 516 contains the following columns: routing filter, EPS bearer ID, Tunnel End ID (TEID), radio access technology (RAT) type, and UE ID. Mapping table 526 contains the following columns: routing filter, EPS bearer ID, and RAT type. Signaling is communicated between UE 502 and PDN-GW 501 to setup mapping entries of the mapping tables. For each mapping entry, UE ID can be any UE-specific information (e.g., IMSI, IP address), RAT type indicates which access network an IP flow is in, TEID is unique for each UE in every specific GPT-based access network, EPS bearer ID indicates which of bearers with different QoS to carry the specific IP flow in one access network, and routing filter is provided by the UE to identify one specific IP flow. A routing filter may include IP source address, IP destination address, source port, destination port, and protocol type that describe IP flows. Using the mapping tables, IP flows can be moved from one access network to another access network based on the routing filters. In addition, IP flows can be moved based on the EPS bearer ID, which corresponds to the same QoS requirement.

FIG. 6 is one example of a mapping table 601 stored at PDN-GW side and a mapping table 602 stored at UE side. In the example of table 601, each UE is identified by its IMSI. UE1 has both 3GPP and non-3GPP RAT type. The 3GPP access is associated with IP traffic via Tunnel #1, and the non-3GPP access is associated with IP traffic via Tunnel #2. Tunnel #1 is used for EPS ID1 indicating the EPS bearer that carries IP flows 1-1, and for EPS ID2 indicating EPS bearer that carries IP flows 2-1 and 2-2. Each EPS bearer ID corresponds to a specific QoS class for all the IP flows carried in the EPS bearer. In the example of table 602, it is the mapping table stored in UE1. Thus, table 602 contains the same mapping entries stored in the PDN-GW for UE1.

FIG. 7 is updated IFOM mapping tables after IP flow-specific IFOM solution. For IP flow-specific IFOM, IP flows are redistributed based on the routing filters. In the example of FIG. 7, UE1 determines to move IP flows from 3GPP access network to non-3GPP access network based on the description of the IP flows under the routing filter. As a result, IP flows that matching the description of IP flows 2-1 are moved from the 3GPP RAT type to the non-3GPP RAT type.

FIG. 8 is updated IFOM mapping tables after QoS-specific IFOM solution. For QoS-specific IFOM, IP flows are redistributed based on the EPS bearer ID. In the example of FIG. 8, UE 1 determines to move IP flows from 3GPP access network to non-3GPP access network based on a specific QoS requirement, which corresponds to EPS ID 2. As a result, all the IP flows carried in EPD ID 2 are moved from the 3GPP RAT type to the non-3GPP RAT type. That is, IP flows that matching the description of IP flows 2-1 and IP flows 2-2 are moved from the 3GPP RAT type to the non-3GPP RAT type.

Figure 9:
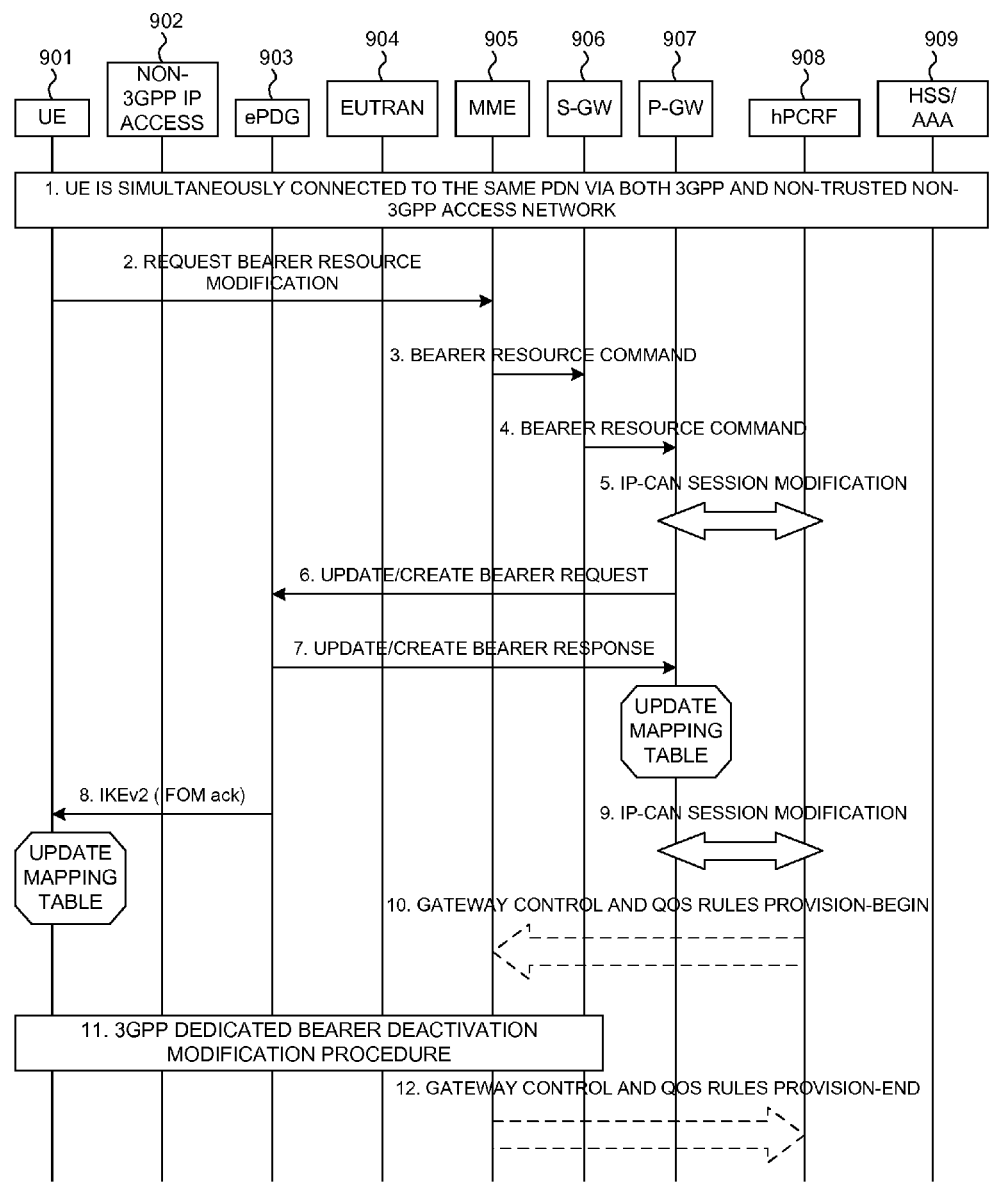
FIG. 9 illustrates one example of message flows for IFOM from 3GPP access network to non-trusted non-3GPP access network triggered from 3GPP access network.

FIG. 9 illustrates one example of message flows for IFOM from 3GPP access network to non-trusted non-3GPP access network triggered from 3GPP access network. In step 1, UE 901 is simultaneously connected to the same PDN-GW 907 via both 3GPP access network 904 and non-trusted non-3GPP access network 902. UE 901 is exchanging some IP flows through the 3GPP access and some other IP flows through the non-trusted non-3GPP access. Later on, UE 901 decides to move some IP flows from the 3GPP access to the non-trusted non-3GPP access. In step 2, UE 901 sends an IFOM triggering message and related parameters to MME 905 via Request Bearer Resource Modification (e.g., contains IFOM flag, target RAT type, EPS bearer ID, QoS, and TAD) message. In step 3, MME 905 sends a Bearer Resource Command (e.g., contains, IMSI of UE 901, IFOM flag, target RAT type, EPS bearer ID, QoS, and TAD) message to S-GW 906. In step 4, S-GW 906 sends the same Bearer Resource Command message to PDN-GW 907.

Based on the EPS ID and TAD in the Bearer Resource Command, PDN-GW 907 selects the IP flows to be moved in step 5. PDN-GW 907 also sends an IP-CAN Session Modification Request to hPCRF 908 to indicate how the mappings between SDFs (Service Data Flows) and the access networks have changed. In step 6, PDN-GW 907 uses the received QoS policy to assign the EPS Bearer QoS (e.g., assigns the values to the bearer level QoS parameters including QCI, ARP, GBR, and MBR) by sending an Update/Create Bearer Request message to ePDG 903 to modify or create the required S2b bearer for the IP flows to be moved. For example, if there is already a bearer that satisfies the QoS requirement, then the PDN-GW sends an Update Bearer Request message to the ePDG to modify the target bearer. Otherwise, the PDN-GW sends a Create Bearer Request message to create a new bearer for supporting the required QoS.

In step 7, if Update Bearer Request message is received, then ePDG 903 uses the uplink packet filter to determine the mapping traffic flows to the S2b bearer and acknowledges the S2b bearer modification by sending an Update Bearer Response (EPS Bearer ID) message to PDN-GW 907. If the Create Bearer Request message is received, then ePDG 903 selects an EPS Bearer ID that has not yet been assigned to the UE. The ePDG then stores the EPS Bearer ID and links the dedicated bearer to the default bearer. The ePDG uses the uplink packet filter to determine the mapping of uplink traffic flows to the S2b bearer. The ePDG then acknowledges the S2b bearer activation to PDN-GW 907 by sending a Create Bearer Response (EPS Bearer ID, ePDG Address for the user plane, ePDG TEID of the user plane) message. PDN-GW 907 then updates its mapping table if the Update/Create Bearer Request is successful. In step 8, ePDG 903 sends an IFOM-enhanced IKEv2 message in IKEv2 Configuration payloads to UE 901 to indicate that the IFOM request has been accepted. UE 901 then updates its mapping table after receiving the IFOM acknowledgement. In steps 9-12, PDN-GW 907 sends an IP-CAN Session Modification Response to hPCRF 908 to trigger the 3GPP dedicated bearer deactivation or modification procedure for the services moved to the non-trusted non-3GPP access.

Figure 10:
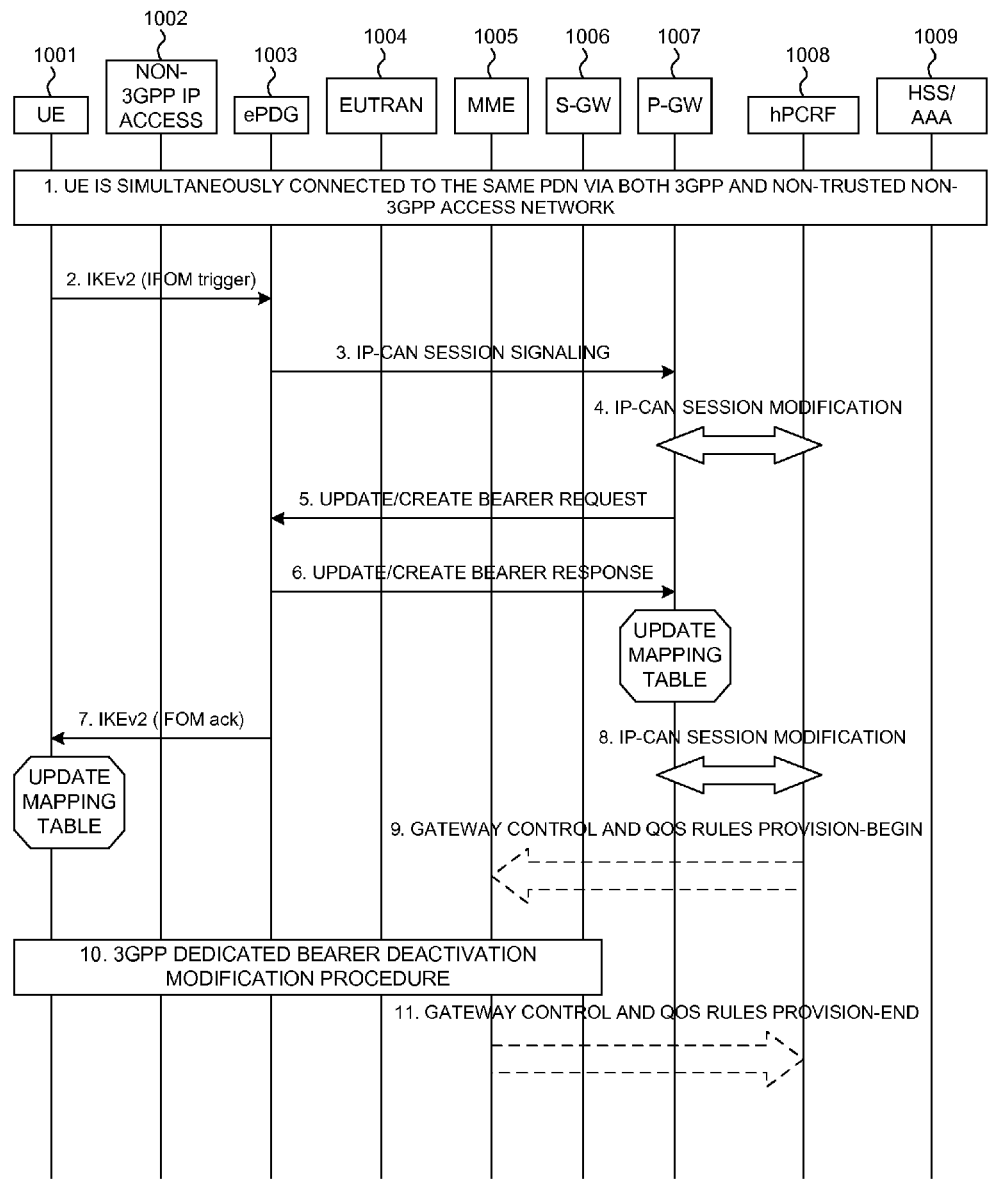
FIG. 10 illustrates one example of message flows for IFOM from 3GPP access network to non-trusted non-3GPP access network triggered from non-trusted non-3GPP access network.

FIG. 10 illustrates one example of message flows for IFOM from 3GPP access network to non-trusted non-3GPP access network triggered from non-trusted non-3GPP access network. In step 1, UE 1001 is simultaneously connected to the same PDN-GW 1007 via both 3GPP access network 1004 and non-trusted non-3GPP access network 1002. UE 1001 is exchanging some IP flows through the 3GPP access and some other IP flows through the non-trusted non-3GPP access. Later on, UE 1001 decides to move some IP flows from the 3GPP access to the non-trusted non-3GPP access. In step 2, UE 1001 sends an IFOM-enhanced IKEv2 message, which includes IFOM flag, target RAT type, EPS Bearer ID, QoS and TAD, in IKEv2 Configuration payloads to ePDG 1003 to trigger IFOM. The IFOM flag is an optional IE to specify that the UE requests to start IP flow mobility. The target RAT type indicates the access network to which the UE wants to move the specific IP flows. The EPS Bearer ID is the bearer that carries the routing filters to be moved. QoS is the QoS policy to be satisfied for the specific IP flows. The TAD (Traffic Aggregation Description) includes the routing filters the UE request to move. If the IFOM procedure is based on QoS, then the TAD is a match-all filter. That way, all IP flows over the same bearer will be moved.

In step 3, ePDG 1003 sends an IFOM-enhanced IP-CAN Session signaling, which includes IMSI, IFOM flag, target RAT type, EPS Bearer ID, QoS and TAD provided by UE 1001 to inform PDN-GW 1007 to start IP-CAN session modification with hPCRF 1008. In step 4, PDN-GW 1007 selects the IP flows to be moved based on the EPS Bearer ID and TAD in the IFOM-enhanced IP-CAN Session signaling. The PDN-GW then sends an IP-CAN session modification request to hPCRF 1008 to indicate how the mapping between SDFs and the accesses have changed. In step 5, PDN-GW 1007 uses the received QoS policy to assign the EPS Bearer QoS by sending an Update/Create Bearer Request message to ePDG 1003 to modify or create the required S2b bearer for the IP flows to be moved. In step 6, ePDG 1003 uses the uplink packet filter to determine the mapping traffic flows to the S2b bearer and acknowledges the S2b bearer modification or creation by sending an Update/Create Bearer Response message to PDN-GW 1007. PDN-GW 1007 then updates its mapping table if the Update/Create Bearer Request is successful. In step 7, ePDG 1003 sends an IFOM-enhanced IKEv2 message in IKEv2 Configuration payloads to UE 1001 to indicate that the IFOM request has been accepted. UE 1001 then updates its mapping table after receiving the IFOM acknowledgement. In steps 8-11, PDN-GW 1007 sends an IP-CAN Session Modification Response to hPCRF 1008 to trigger the 3GPP dedicated bearer deactivation or modification procedure for the services moved to the non-trusted non-3GPP access.

In the above examples, IP flows are moved from 3GPP to non-3GPP access with GTP-based S2b. In other scenarios, IP flows are moved from non-3GPP with GTP-based S2b to 3GPP access, depending on network condition.

Figure 11:
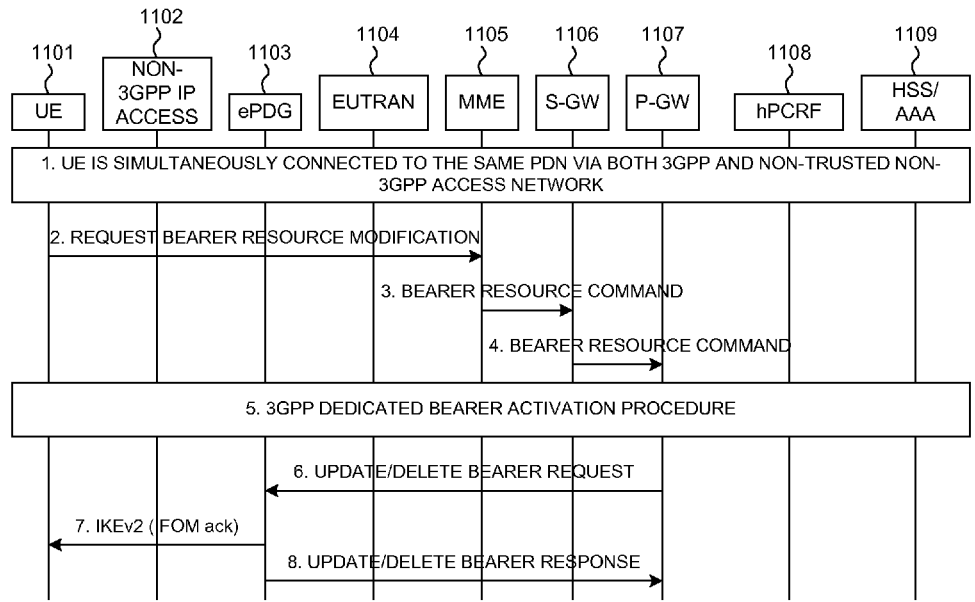
FIG. 11 illustrates one example of message flows for IFOM from non-trusted non-3GPP access network to 3GPP access network triggered from 3GPP access network.

FIG. 11 illustrates one example of message flows for IFOM from non-trusted non-3GPP access network to 3GPP access network triggered from 3GPP access network. In step 1, UE 1101 is simultaneously connected to the same PDN-GW 1107 via both 3GPP access network 1104 and non-trusted non-3GPP access network 1102. UE 1101 is exchanging some IP flows through the 3GPP access and some other IP flows through the non-trusted non-3GPP access. Later on, UE 1101 decides to move some IP flows from the non-trusted non-3GPP access to the 3GPP access. In step 2, UE 1101 sends an IFOM triggering message and related parameters to MME 1105 via Request Bearer Resource Modification (e.g., contains IFOM flag, target RAT type, EPS bearer ID, QoS, and TAD) message. In step 3, MME 1105 sends a Bearer Resource Command (e.g., contains IMSI of UE 1101, IFOM flag, target RAT type, EPS bearer ID, QoS, and TAD) message to S-GW 1106. In step 4, S-GW 1106 sends the same Bearer Resource Command message to PDN-GW 1107.

In step 5, the 3GPP dedicated bearer activation procedure is initiated. In step 6, PDN-GW 1107 sends an Update/Delete Bearer request to ePDG 1103 to modify or deactivate or release the S2b bearers corresponding to those IP flows to be moved to 3GPP access. In step 7, ePDG 1103 sends an IFOM-enhanced IKEv2 message in IKEv2 Configuration payloads to UE 1101 to indicate that the IFOM request has been accepted. UE 1101 then updates its mapping table after it receives the IFOM acknowledgement. In step 8, ePDG 1103 acknowledges to PDN-GW 1107 the S2b bearer modification or deletion by sending an Update/Delete Bearer Response message to PDN-GW 1107. PDN-GW 1107 then updates its mapping table if the Update/Delete Bearer Request is successful.

Figure 12:
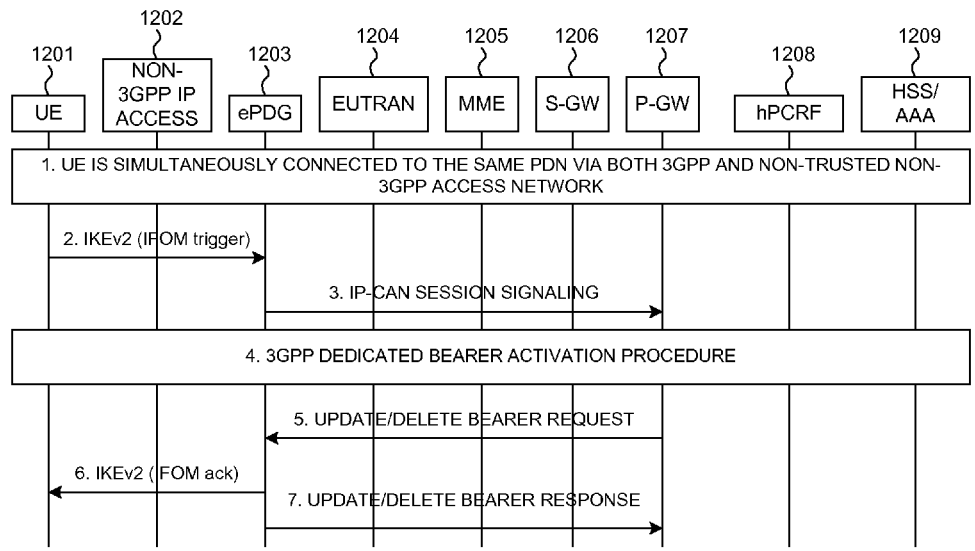
FIG. 12 illustrates one example of message flows for IFOM from non-trusted non-3GPP access network to 3GPP access network triggered from non-trusted non-3GPP access network.

FIG. 12 illustrates one example of message flows for IFOM from non-trusted non-3GPP access network to 3GPP access network triggered from non-trusted non-3GPP access network. In step 1, UE 1201 is simultaneously connected to the same PDN-GW 1207 via both 3GPP access network 1204 and non-trusted non-3GPP access network 1202. UE 1201 is exchanging some IP flows through the 3GPP access and some other IP flows through the non-trusted non-3GPP access. Later on, UE 1201 decides to move some IP flows from the non-trusted non-3GPP access to the 3GPP access. In step 2, UE 1201 sends an IFOM-enhanced IKEv2 message, which includes IFOM flag, target RAT type, EPS Bearer ID, QoS and TAD, in IKEv2 Configuration payloads to ePDG 1203 to trigger IFOM. In step 3, ePDG 1003 sends an IFOM-enhanced IP-CAN Session signaling, which includes IMSI, IFOM flag, target RAT type, EPS Bearer ID, QoS and TAD provided by UE 1201 to inform PDN-GW 1207 to start IP-CAN session modification with hPCRF 1208.

In step 4, the 3GPP dedicated bearer activation procedure is initiated. In step 5, PDN-GW 1207 sends an Update/Delete Bearer request to ePDG 1203 to modify or deactivate or release the S2b bearers corresponding to those IP flows to be moved to 3GPP access. In step 6, ePDG 1203 sends an IFOM-enhanced IKEv2 message in IKEv2 Configuration payloads to UE 1201 to indicate that the IFOM request has been accepted. UE 1201 then updates its mapping table after it receives the IFOM acknowledgement. In step 7, ePDG 1203 acknowledges to PDN-GW 1207 the S2b bearer modification or deletion by sending an Update/Delete Bearer Response message to PDN-GW 1207. PDN-GW 1207 then updates its mapping table if the Update/Delete Bearer Request is successful.

The above IFOM solutions may be applied to move IP flows between 3GPP and non-trusted non-3GPP access with GTP-based S2b interface. Similar IFOM solutions may be applied to move IP flows between 3GPP and trusted non-3GPP access with GTP-based S2a interface.

Figure 13:
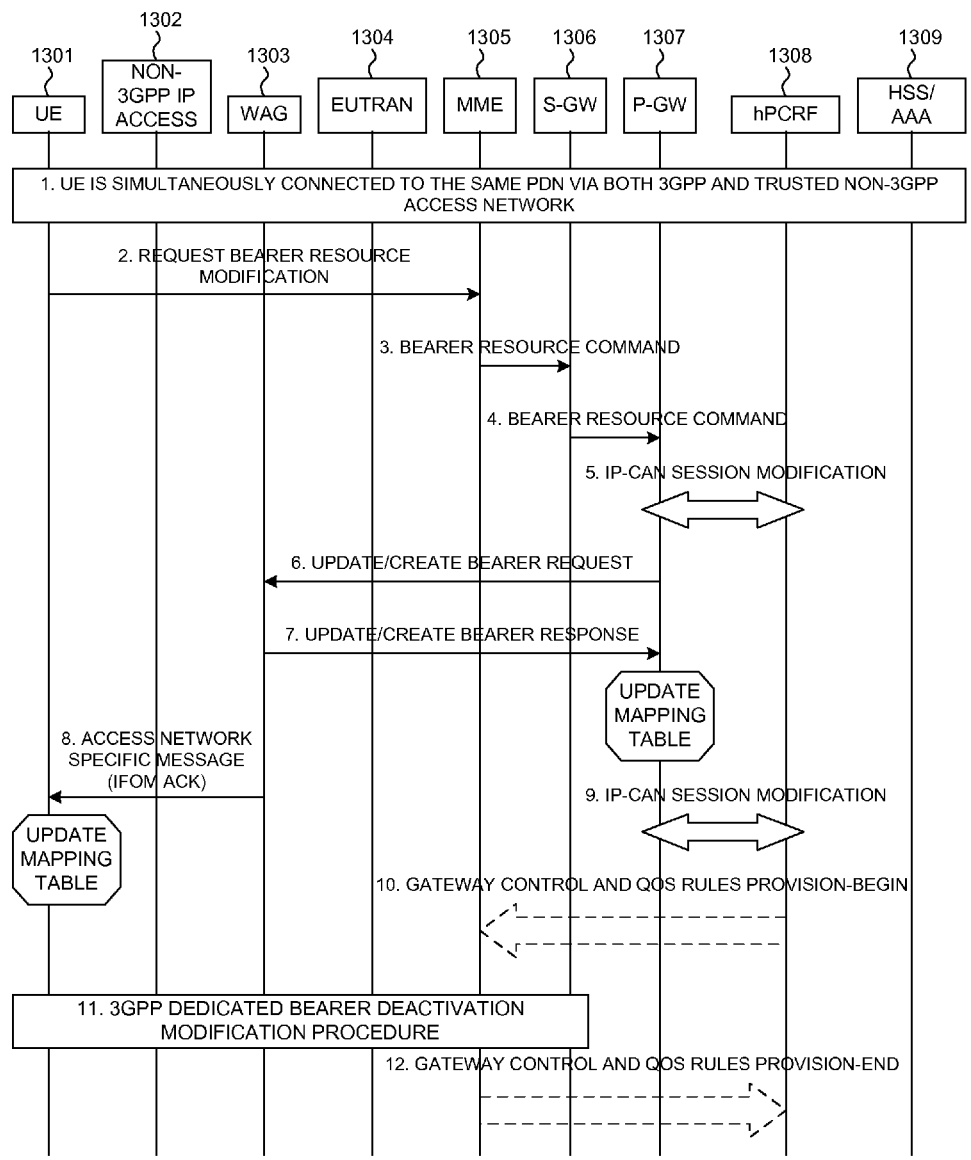
FIG. 13 illustrates one example of message flows for IFOM from 3GPP access network to trusted non-3GPP access network triggered from 3GPP access network.

FIG. 13 illustrates one example of message flows for IFOM from 3GPP access network to trusted non-3GPP access network triggered from 3GPP access network. In step 1, UE 1301 is simultaneously connected to the same PDN-GW 1307 via both 3GPP access network 1304 and trusted non-3GPP access network 1302. UE 1301 is exchanging some IP flows through the 3GPP access and some other IP flows through the trusted non-3GPP access. Later on, UE 1301 decides to move some IP flows from the 3GPP access to the trusted non-3GPP access. In step 2, UE 1301 sends an IFOM triggering message and related parameters to MME 1305 via Request Bearer Resource Modification (e.g., contains IFOM flag, target RAT type, EPS bearer ID, QoS, and TAD) message. In step 3, MME 1305 sends a Bearer Resource Command (e.g., contains, IMSI of UE 1301, IFOM flag, target RAT type, EPS bearer ID, QoS, and TAD) message to S-GW 1306. In step 4, S-GW 1306 sends the same Bearer Resource Command message to PDN-GW 1307.

Based on the EPS ID and TAD in the Bearer Resource Command, PDN-GW 1307 selects the IP flows to be moved in step 5. PDN-GW 1307 also sends an IP-CAN Session Modification Request to hPCRF 1308 to indicate how the mappings between SDFs (Service Data Flows) and the access networks have changed. In step 6, PDN-GW 1307 uses the received QoS policy to assign the EPS Bearer QoS (e.g., assigns the values to the bearer level QoS parameters including QCI, ARP, GBR, and MBR) by sending an Update/Create Bearer Request message to WAG 1303 to modify or create the required S2a bearer for the IP flows to be moved. For example, if there is already a bearer that satisfies the QoS requirement, then the PDN-GW sends an Update Bearer Request message to the WAG to modify the target bearer. Otherwise, the PDN-GW sends a Create Bearer Request message to create a new bearer for supporting the required QoS.

In step 7, if Update Bearer Request message is received, then WAG 1303 uses the uplink packet filter to determine the mapping traffic flows to the S2a bearer and acknowledges the S2a bearer modification by sending an Update Bearer Response (EPS Bearer ID) message to PDN-GW 1307. If the Create Bearer Request message is received, then WAG 1303 selects an EPS Bearer ID that has not yet been assigned to the UE. The WAG then stores the EPS Bearer ID and links the dedicated bearer to the default bearer. The WAG uses the uplink packet filter to determine the mapping of uplink traffic flows to the S2a bearer. The WAG then acknowledges the S2a bearer activation to PDN-GW 1307 by sending a Create Bearer Response (EPS Bearer ID, WAG Address for the user plane, WAG TEID of the user plane) message. PDN-GW 1307 then updates its mapping table if the Update/Create Bearer Request is successful. In step 8, WAG 1303 sends an access network specific message carrying IFOM ACK to UE 1301 to indicate that the IFOM request has been accepted. UE 1301 then updates its mapping table after receiving the IFOM acknowledgement. In steps 9-12, PDN-GW 1307 sends an IP-CAN Session Modification Response to hPCRF 1308 to trigger the 3GPP dedicated bearer deactivation or modification procedure for the services moved to the trusted non-3GPP access.

Figure 14:
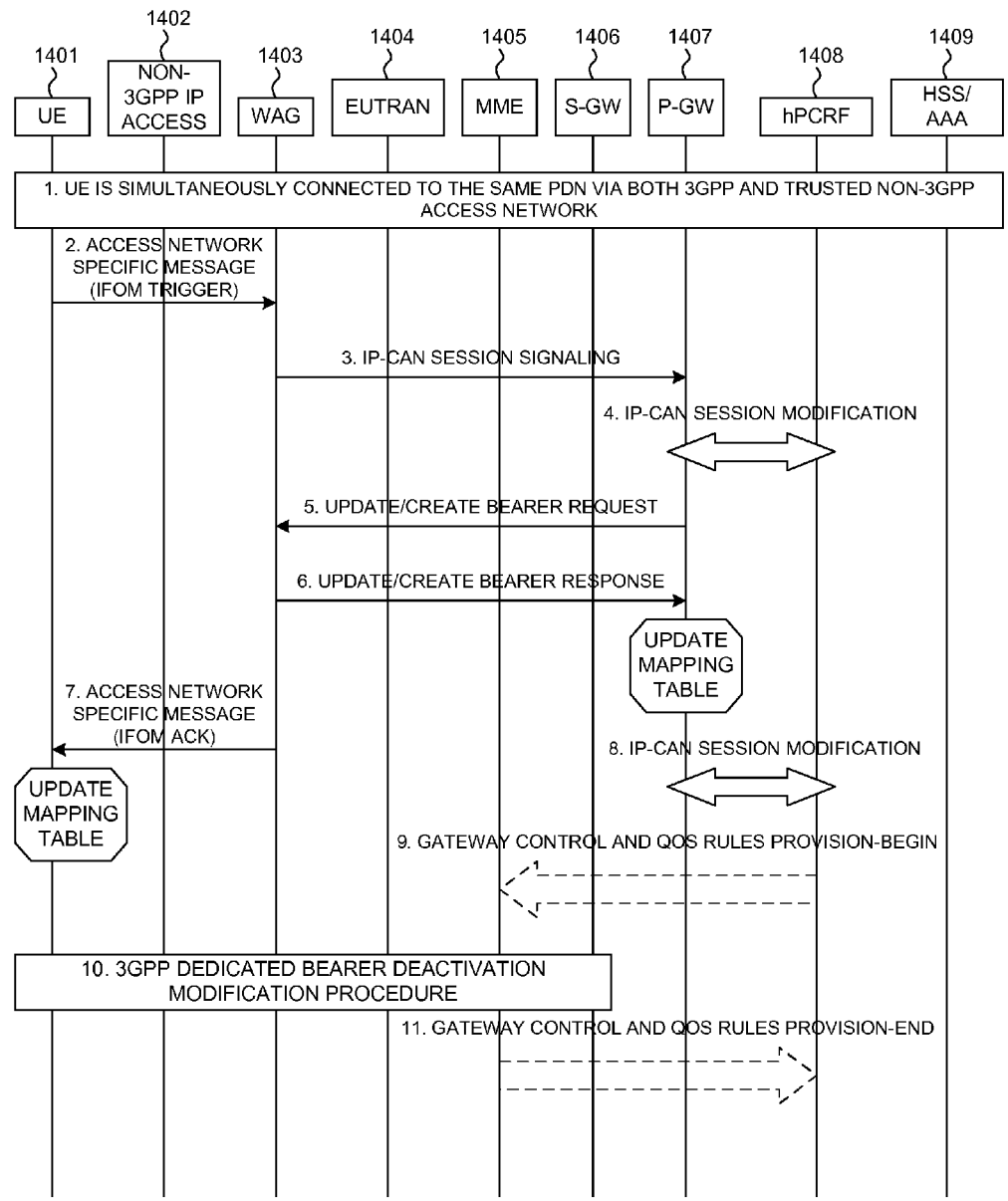
FIG. 14 illustrates one example of message flows for IFOM from 3GPP access network to trusted non-3GPP access network triggered from trusted non-3GPP access network.

FIG. 14 illustrates one example of message flows for IFOM from 3GPP access network to trusted non-3GPP access network triggered from trusted non-3GPP access network. In step 1, UE 1401 is simultaneously connected to the same PDN-GW 1407 via both 3GPP access network 1404 and trusted non-3GPP access network 1402. UE 1401 is exchanging some IP flows through the 3GPP access and some other IP flows through the trusted non-3GPP access. Later on, UE 1401 decides to move some IP flows from the 3GPP access to the trusted non-3GPP access. In step 2, UE 1401 sends an access network specific message, which includes IFOM flag, target RAT type, EPS Bearer ID, QoS and TAD, to WAG 1403 to trigger IFOM. The IFOM flag is an optional IE to specify that the UE requests to start IP flow mobility. The target RAT type indicates the access network to which the UE wants to move the specific IP flows. The EPS Bearer ID is the bearer that carries the routing filters to be moved. QoS is the QoS policy to be satisfied for the specific IP flows. The TAD (Traffic Aggregation Description) includes the routing filters the UE request to move. If the IFOM procedure is based on QoS, then the TAD is a match-all filter. That way, all IP flows over the same bearer will be moved.

In step 3, WAG 1403 sends an IFOM-enhanced IP-CAN Session signaling, which includes IMSI, IFOM flag, target RAT type, EPS Bearer ID, QoS and TAD provided by UE 1401 to inform PDN-GW 1407 to start IP-CAN session modification with hPCRF 1408. In step 4, PDN-GW 1407 selects the IP flows to be moved based on the EPS Bearer ID and TAD in the IFOM-enhanced IP-CAN Session signaling. The PDN-GW then sends an IP-CAN session modification request to hPCRF 1408 to indicate how the mapping between SDFs and the accesses have changed. In step 5, PDN-GW 1407 uses the received QoS policy to assign the EPS Bearer QoS by sending an Update/Create Bearer Request message to WAG 1403 to modify or create the required S2a bearer for the IP flows to be moved. In step 6, WAG 1403 uses the uplink packet filter to determine the mapping traffic flows to the S2a bearer and acknowledges the S2a bearer modification or creation by sending an Update/Create Bearer Response message to PDN-GW 1407. PDN-GW 1407 then updates its mapping table if the Update/Create Bearer Request is successful. In step 7, WAG 1403 sends an access network specific message carrying IFOM ACK to UE 1401 to indicate that the IFOM request has been accepted. UE 1401 then updates its mapping table after receiving the IFOM acknowledgement. In steps 8-11, PDN-GW 1407 sends an IP-CAN Session Modification Response to hPCRF 1408 to trigger the 3GPP dedicated bearer deactivation or modification procedure for the services moved to the trusted non-3GPP access.

In the above examples, IP flows are moved from 3GPP to non-3GPP access with GTP-based S2a. In other scenarios, IP flows are moved from non-3GPP with GTP-based S2a to 3GPP access, depending on network condition.

Figure 15:
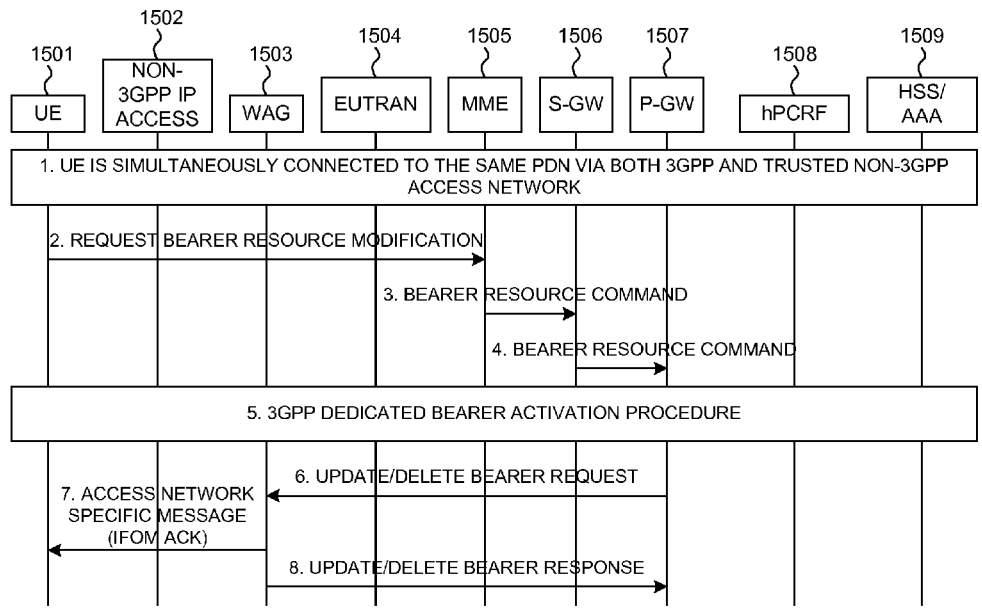
FIG. 15 illustrates one example of message flows for IFOM from trusted non-3GPP access network to 3GPP access network triggered from 3GPP access network.

FIG. 15 illustrates one example of message flows for IFOM from trusted non-3GPP access network to 3GPP access network triggered from 3GPP access network. In step 1, UE 1501 is simultaneously connected to the same PDN-GW 1507 via both 3GPP access network 1504 and trusted non-3GPP access network 1502. UE 1501 is exchanging some IP flows through the 3GPP access and some other IP flows through the trusted non-3GPP access. Later on, UE 1501 decides to move some IP flows from the trusted non-3GPP access to the 3GPP access. In step 2, UE 1501 sends an IFOM triggering message and related parameters to MME 1505 via Request Bearer Resource Modification (e.g., contains IFOM flag, target RAT type, EPS bearer ID, QoS, and TAD) message. In step 3, MME 1505 sends a Bearer Resource Command (e.g., contains IMSI of UE 1501, IFOM flag, target RAT type, EPS bearer ID, QoS, and TAD) message to S-GW 1506. In step 4, S-GW 1506 sends the same Bearer Resource Command message to PDN-GW 1507.

In step 5, the 3GPP dedicated bearer activation procedure is initiated. In step 6, PDN-GW 1507 sends an Update/Delete Bearer Request to WAG 1503 to modify or deactivate or release the S2a bearers corresponding to those IP flows to be moved to 3GPP access. In step 7, WAG 1503 sends an access network specific message carrying IFOM Ack to UE 1501 to indicate that the IFOM request has been accepted. UE 1501 then updates its mapping table after it receives the IFOM acknowledgement. In step 8, WAG 1503 acknowledges to PDN-GW 1507 the S2a bearer modification or deletion by sending an Update/Delete Bearer Response message to PDN-GW 1507. PDN-GW 1507 then updates its mapping table if the Update/Delete Bearer Request is successful.

Figure 16:
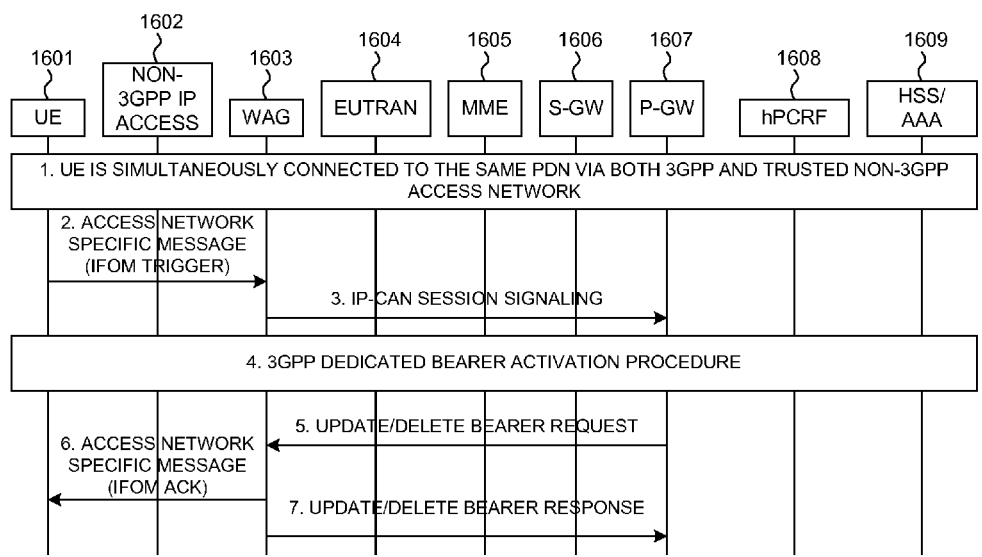
FIG. 16 illustrates one example of message flows for IFOM from trusted non-3GPP access network to 3GPP access network triggered from trusted non-3GPP access network.

FIG. 16 illustrates one example of message flows for IFOM from trusted non-3GPP access network to 3GPP access network triggered from trusted non-3GPP access network. In step 1, UE 1201 is simultaneously connected to the same PDN-GW 1607 via both 3GPP access network 1604 and trusted non-3GPP access network 1602. UE 1601 is exchanging some IP flows through the 3GPP access and some other IP flows through the trusted non-3GPP access. Later on, UE 1601 decides to move some IP flows from the trusted non-3GPP access to the 3GPP access. In step 2, UE 1601 sends an access network specific message, which includes IFOM flag, target RAT type, EPS Bearer ID, QoS and TAD, to WAG 1603 to trigger IFOM. In step 3, WAG 1603 sends an IFOM-enhanced IP-CAN Session signaling, which includes IMSI, IFOM flag, target RAT type, EPS Bearer ID, QoS and TAD provided by UE 1601 to inform PDN-GW 1607 to start IP-CAN session modification with hPCRF 1608.

In step 4, the 3GPP dedicated bearer activation procedure is initiated. In step 5, PDN-GW 1607 sends an Update/Delete Bearer request to WAG 1603 to modify, deactivate, or release the S2a bearers corresponding to those IP flows to be moved to 3GPP access. In step 6, WAG 1603 sends an access network specific message carrying IFOM Ack to UE 1601 to indicate that the IFOM request has been accepted. UE 1601 then updates its mapping table after it receives the IFOM acknowledgement. In step 7, WAG 1603 acknowledges to PDN-GW 1607 the S2a bearer modification or deletion by sending an Update/Delete Bearer Response message to PDN-GW 1607. PDN-GW 1607 then updates its mapping table if the Update/Delete Bearer Request is successful.

Figure 17:
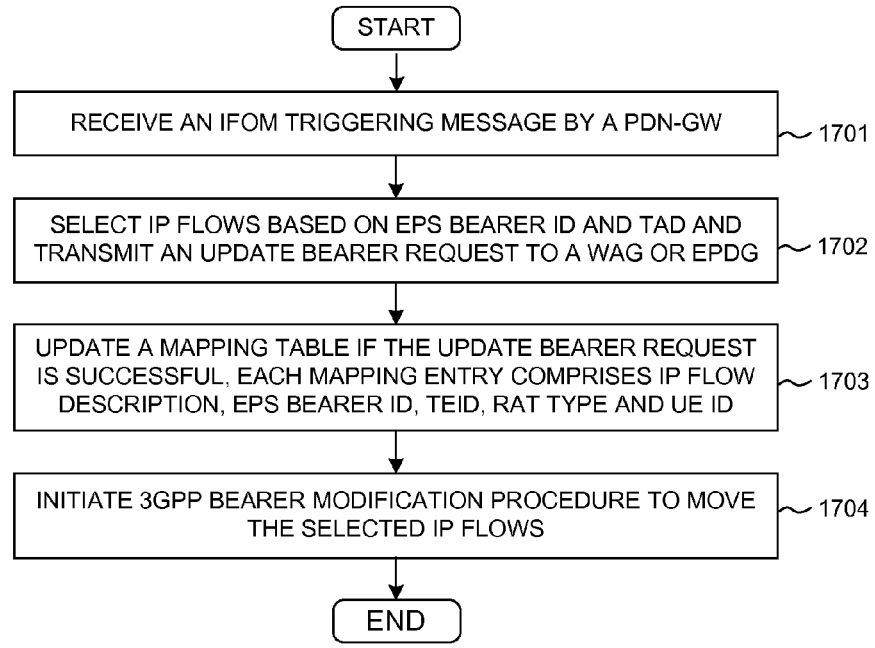
FIG. 17 is a flow chart of an IFOM solution from PDN-GW perspective in accordance with one novel aspect.

FIG. 17 is a flow chart of an IFOM solution from PDN-GW perspective in accordance with one novel aspect. In step 1701, a PDN-GW receives an IP flow mobility (IFOM) triggering message and related parameters. The IFOM triggering message comprises an IFOM flag, a target radio access technology (RAT) type, an EPS bearer ID, a Quality of Service (QoS) policy, and a traffic aggregation description (TAD). In step 1702, the PDN-GW selects IP flows based on the IFOM triggering message and transmitting an update bearer request to a wireless access gateway (WAG) or an evolved packet data gateway (ePDG). In one example, the IP flows are selected based on the TAD. In another example, the IP flows are selected based on the EPS bearer ID. In step 1703, the PDN-GW updates a mapping table having one or more mapping entries if the update bearer request is successful. Each mapping entry comprises an IP flow description, an EPS bearer ID, a GTP tunnel ID, a radio access technology (RAT) type and a UE ID. In step 1704, the PDN-GW initiates a 3GPP dedicated bearer modification procedure to move the selected IP flows.

Figure 18:
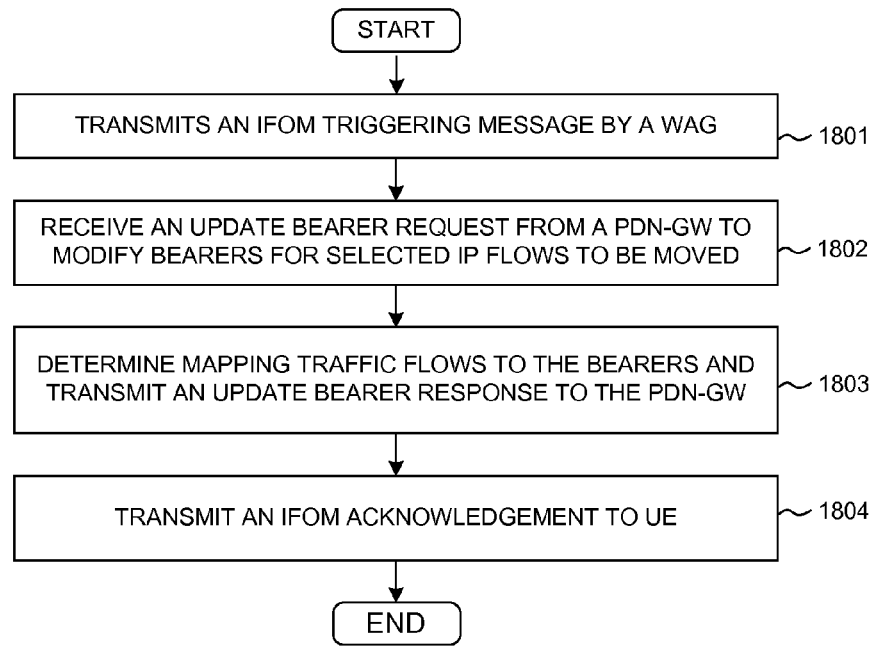
FIG. 18 is a flow chart of an IFOM solution from WAG perspective in accordance with one novel aspect.

FIG. 18 is a flow chart of an IFOM solution from WAG perspective in accordance with one novel aspect. In step 1801, a WAG transmits an IP flow mobility (IFOM) triggering message and related parameters to a PDN-GW. The IFOM triggering message comprises an IFOM flag, a target radio access technology (RAT) type, an EPS bearer ID, a Quality of Service (QoS) policy, and a traffic aggregation description (TAD). In step 1802, the WAG receives an update bearer request from the PDN-GW to modify S2a bearers for selected IP flows to be moved. In one example, the IP flows are selected based on the TAD. In another example, the IP flows are selected based on the EPS bearer ID. In step 1803, the WAG transmits an update bearer response to acknowledge the S2a bearer modification. In step 1804, the WAG sends an IFOM acknowledgement to UE to indicate that the IFOM request has been accepted.

Figure 19:
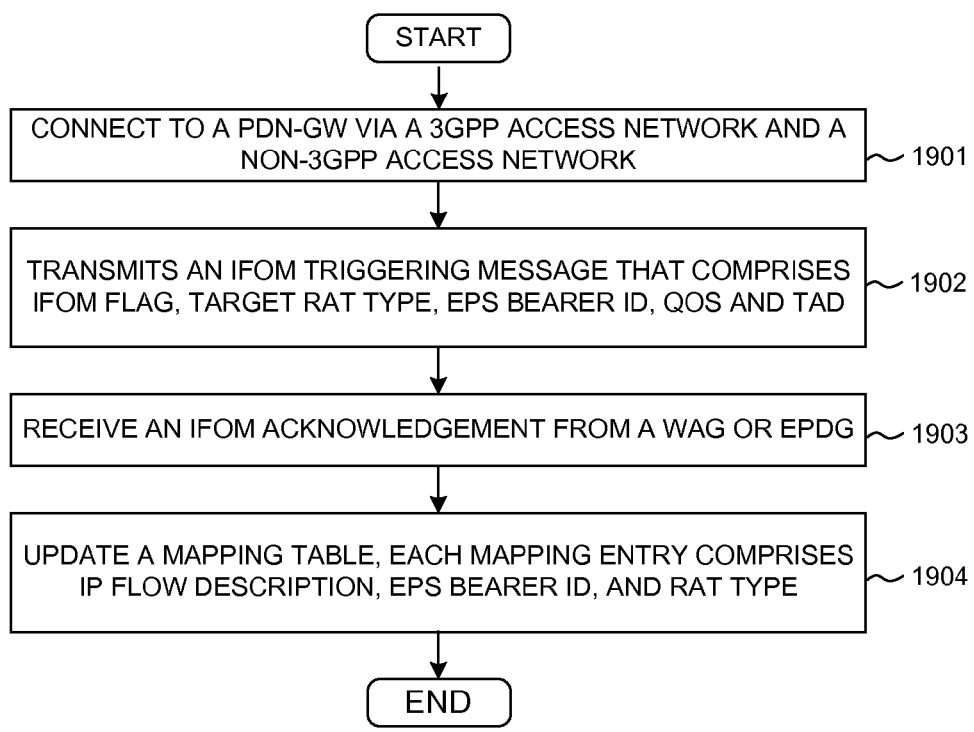
FIG. 19 is a flow chart of an IFOM solution from UE perspective in accordance with one novel aspect.

FIG. 19 is a flow chart of an IFOM solution from UE perspective in accordance with one novel aspect. In step 1901, a UE connects to a packet data network gateway (PDN-GW) via a 3GPP access network and a non-3GPP access network. In step 1902, the UE transmits an IP flow mobility (IFOM) triggering message that comprises an IFOM flag, a target radio access technology (RAT) type, an EPS bearer ID, a Quality of Service (QoS) policy, and a traffic aggregation description (TAD). In one example, the IFOM triggering message is an IFOM-enhanced IKEv2 message. In step 1903, the UE receives an IFOM acknowledgement from a wireless access gateway (WAG) or an evolved packet data gateway (ePDG). In one example, the IFOM acknowledgement is an IFOM-enhanced IKEv2 message. In step 1904, the UE updates a mapping table having one or more mapping entries. Each mapping entry comprises an IP flow description, an EPS bearer ID, and a radio access technology (RAT) type.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving an IP flow mobility (IFOM) triggering message by a packet data network gateway (PDN-GW), wherein the IFOM triggering message comprises an IFOM flag, a target radio access technology (RAT) type, an EPS bearer ID, a Quality of Service (QoS) policy, and a traffic aggregation description (TAD);
   selecting IP flows based on the IFOM triggering message and transmitting an update bearer request to a wireless access gateway (WAG) or an evolved packet data gateway (ePDG);
   updating a mapping table having one or more mapping entries if the update bearer request is successful, wherein each mapping entry is updated to indicate to which RAT type each IP flow is directed; and
   initiating a 3GPP bearer modification procedure to move the selected IP flows.

2. The method of claim 1, wherein the IP flows are selected based on the TAD describing the IP flows to be moved to the target RAT type.

3. The method of claim 1, wherein the IP flows are selected based on the EPS bearer ID corresponds to a QoS class, and wherein all IP flows carried in the EPS bearer ID are to be moved to the target RAT type.

4. The method of claim 1, wherein the mapping table comprises IP flow descriptions, and corresponding EPS bearer IDs, GTP tunnel IDs, RAT types and UE IDs.

5. The method of claim 1, wherein the selected IP flows are moved from 3GPP access to non-3GPP access with GTP-based interface.

6. The method of claim 5, wherein the update bearer request is a create bearer request to create a new bearer that satisfies the QoS policy defined for the selected IP flows, and wherein the create bearer request comprises the new bearer ID and a corresponding GTP tunnel ID.

7. The method of claim 1, wherein the selected IP flows are moved from non-3GPP access with GTP-based interface to 3GPP access.

8. The method of claim 7, wherein the update bearer request is a delete bearer request to delete bearers corresponding to the selected IP flows moved to 3GPP access.

9. A method comprising:
   transmitting an IP flow mobility (IFOM) triggering message by a wireless access gateway (WAG), wherein the IFOM triggering message comprises an IFOM flag, a target radio access technology (RAT) type, an EPS bearer ID, a Quality of Service (QoS) policy, and a traffic aggregation description (TAD);
   receiving an update bearer request from a packet data network gateway (PDN-GW) to modify S2a bearers for selected IP flows to be moved;
   determining mapping traffic flows to the S2a bearers and transmitting an update bearer response to the PDN-GW to acknowledge the S2a bearer modification; and
   transmitting an IFOM acknowledgement to a user equipment (UE).

10. The method of claim 9, wherein the selected IP flows are determined based on the TAD or the EPS bearer ID.

11. The method of claim 9, wherein the selected IP flows are moved from 3GPP access to non-3GPP access with GTP-based S2a interface.

12. The method of claim 11, wherein the update bearer request is a create bearer request to create a new S2a bearer that satisfies the QoS policy defined for the selected IP flows, and wherein the create bearer request comprises the new S2a bearer ID and a corresponding GTP tunnel ID.

13. The method of claim 9, wherein the selected IP flows are moved from non-3GPP access with GTP-based S2a interface to 3GPP access.

14. The method of claim 13, wherein the update bearer request is a delete bearer request to delete S2a bearers corresponding to the selected IP flows moved to 3GPP access.

15. A method comprising:
   connecting to a packet data network gateway (PDN-GW) by a user equipment (UE) via a 3GPP access network and a non-3GPP access network;
   transmitting an IP flow mobility (IFOM) triggering message that comprises an IFOM flag, a target radio access technology (RAT) type, an EPS bearer ID, a Quality of Service (QoS) policy, and a traffic aggregation description (TAD);
   receiving an IFOM acknowledgement from an evolved packet data gateway (ePDG); and
   updating a mapping table having one or more mapping entries, wherein each mapping entry is updated to indicate to which RAT type each IP flow is directed.

16. The method of claim 15, wherein the UE determines IFOM based on IP flow, and wherein the TAD includes one or more IP flows to be moved to the target RAT type.

17. The method of claim 15, wherein the UE determines IFOM based on QoS class, and wherein all IP flows carried in the EPS bearer ID are to be moved to the target RAT type.

18. The method of claim 15, wherein the mapping table comprises IP flow descriptions and corresponding EPS bearer IDs and RAT types.

19. The method of claim 15, wherein the IFOM triggering message is an IFOM-enhanced IKEv2 message.

20. The method of claim 15, wherein the IFOM acknowledgement is an IFOM-enhanced IKEv2 message.

* * * * *